US010695859B2

(12) United States Patent
Gattabria et al.

(10) Patent No.: US 10,695,859 B2
(45) Date of Patent: Jun. 30, 2020

(54) ELECTRIC RESISTANCE WELDING HEAD WITH ELECTRODES LOCATED ON THE SAME SIDE

(71) Applicant: Comau S.p.A., Grugliasco (Turin) (IT)

(72) Inventors: Massimo Gattabria, Grugliasco (IT); Cristina De Chirico, Grugliasco (IT); Carmelo Marsicovetere, Grugliasco (IT); Mauro Maestri, Grugliasco (IT); Giovanni Di Stefano, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 327 days.

(21) Appl. No.: 15/834,583

(22) Filed: Dec. 7, 2017

(65) Prior Publication Data

US 2018/0236594 A1   Aug. 23, 2018

(30) Foreign Application Priority Data

Feb. 23, 2017 (EP) ..................................... 17157541

(51) Int. Cl.
*B23K 11/31* (2006.01)
*B23K 11/11* (2006.01)
(Continued)

(52) U.S. Cl.
CPC ............. *B23K 11/318* (2013.01); *B23K 11/11* (2013.01); *B23K 11/115* (2013.01);
(Continued)

(58) Field of Classification Search
CPC ..... B23K 11/318; B23K 11/115; B23K 11/36; B23K 11/255; B23K 11/315; B23K 11/11;
(Continued)

(56) References Cited

U.S. PATENT DOCUMENTS 2,091,474 A   8/1937   Elliot
4,021,909 A   5/1977   Bollmer
(Continued)

FOREIGN PATENT DOCUMENTS

DE   202004012580 U1   9/2005
DE   102004042213 A1   3/2006
(Continued)

OTHER PUBLICATIONS

Notification of Transmittal of the International Search Report and the Written Opinion dated Jul. 25, 2013 from the corresponding International Application No. PCT/IB2013/053759 filed May 9, 2013.
(Continued)

*Primary Examiner* — David P Angwin
*Assistant Examiner* — Bob Zadeh
(74) *Attorney, Agent, or Firm* — Young Basile Hanlon & MacFarlane, P.C.

(57) ABSTRACT

An electronically-controlled electric resistance welding head and method having a support structure and the electrodes located on the same side. The welding head including a ground electrode having an elastic device and a detecting device for detecting a force load on the elastic device on contact with a component to be welded. A welding electrode is movable relative to the ground electrode and the support structure to contact the component to be welded. An electronic control unit is operable to selectively increase the force applied by each electrode when in contact with the component to be welded until respective threshold values are achieved. Current is generated by a transformer for passage to the electrodes.

20 Claims, 8 Drawing Sheets

(51) Int. Cl.
  *B23K 11/25* (2006.01)
  *B23K 11/36* (2006.01)
  *B23K 101/18* (2006.01)
  *B23K 101/00* (2006.01)

(52) U.S. Cl.
  CPC ........... *B23K 11/255* (2013.01); *B23K 11/311* (2013.01); *B23K 11/315* (2013.01); *B23K 11/36* (2013.01); *B23K 2101/006* (2018.08); *B23K 2101/18* (2018.08); *Y10S 901/42* (2013.01)

(58) Field of Classification Search
  CPC ............ B23K 11/311; B23K 2101/006; B23K 2101/18; B23K 11/3009; Y10S 901/42
  See application file for complete search history.

(56) References Cited

U.S. PATENT DOCUMENTS

| | | | |
|---|---|---|---|
| 4,461,407 A | 7/1984 | Finnegan | |
| 4,507,534 A | 3/1985 | Kaufmann et al. | |
| 4,656,858 A | 4/1987 | Addison | |
| 4,785,760 A | 11/1988 | Tholome | |
| 4,955,654 A | 9/1990 | Tsuchihashi et al. | |
| 4,974,752 A | 12/1990 | Sirek | |
| 5,153,405 A | 10/1992 | Umeda | |
| 5,293,911 A | 3/1994 | Akeel | |
| 5,454,869 A | 10/1995 | Roden | |
| 5,482,189 A | 1/1996 | Dentler et al. | |
| 5,705,783 A | 1/1998 | Baustert | |
| 5,880,956 A | 3/1999 | Graf | |
| 6,014,909 A | 1/2000 | Fiora | |
| 6,330,493 B1 | 12/2001 | Takahashi et al. | |
| 6,349,884 B1 | 2/2002 | Thome et al. | |
| 6,401,011 B1 | 6/2002 | Hashimukai | |
| 6,455,800 B1 | 9/2002 | Janssens et al. | |
| 6,556,891 B2 | 4/2003 | Hietmann et al. | |
| 6,636,781 B1 | 10/2003 | Shen et al. | |
| 6,696,810 B2 | 2/2004 | Uematsu et al. | |
| 6,742,722 B2 | 6/2004 | Hosoda et al. | |
| 6,782,294 B2 | 8/2004 | Reich et al. | |
| 6,804,580 B1 | 10/2004 | Stoddard et al. | |
| 6,807,461 B2 | 10/2004 | Kneifel, II et al. | |
| 6,989,176 B2 | 1/2006 | Congard et al. | |
| 7,121,129 B2 | 10/2006 | Binggeli | |
| 7,149,606 B2 | 12/2006 | Krause | |
| 7,152,447 B2 | 12/2006 | Toeniskoetter | |
| 7,220,330 B2 | 5/2007 | Tubb et al. | |
| 7,254,973 B2 | 8/2007 | Campian | |
| 7,290,423 B2 | 11/2007 | Carsley et al. | |
| 7,321,808 B2 | 1/2008 | Nagamatsu | |
| 7,330,777 B2 | 2/2008 | Hashimoto et al. | |
| 7,343,222 B2 | 3/2008 | Solomon | |
| 7,430,939 B2 | 10/2008 | Matsumoto et al. | |
| 7,452,196 B2 | 11/2008 | Khoshnevis | |
| 7,591,078 B2 | 9/2009 | Crampton | |
| 7,738,996 B2 | 6/2010 | Luthardt | |
| 7,779,524 B2 | 8/2010 | Campian | |
| 7,855,350 B2 | 12/2010 | Schurmann et al. | |
| 7,950,260 B2 | 5/2011 | Kinouchi et al. | |
| 7,968,815 B2 | 6/2011 | Murai et al. | |
| 8,006,586 B2 | 8/2011 | Tealdi et al. | |
| 8,024,950 B2 | 9/2011 | Harrow et al. | |
| 8,863,606 B2 | 10/2014 | Ichibangase et al. | |
| 9,571,502 B2 | 2/2017 | Basso et al. | |
| 2002/0111702 A1 | 8/2002 | Angel | |
| 2002/0125219 A1 | 9/2002 | Janssens et al. | |
| 2003/0014500 A1 | 1/2003 | Schleiss et al. | |
| 2003/0095514 A1 | 5/2003 | Sabe et al. | |
| 2004/0045940 A1 | 3/2004 | Angel | |
| 2005/0065647 A1 | 3/2005 | Perry et al. | |
| 2005/0189435 A1 | 9/2005 | Kubota et al. | |
| 2006/0081331 A1 | 4/2006 | Campian | |
| 2006/0088367 A1 | 4/2006 | Dellach et al. | |
| 2006/0095169 A1 | 5/2006 | Minor et al. | |
| 2006/0101936 A1 | 5/2006 | Inoue et al. | |
| 2006/0122730 A1 | 6/2006 | Niemela et al. | |
| 2006/0158152 A1 | 7/2006 | Taniguchi et al. | |
| 2006/0217842 A1 | 9/2006 | Kobayashi et al. | |
| 2006/0293788 A1 | 12/2006 | Pogodin | |
| 2007/0019641 A1 | 1/2007 | Pai et al. | |
| 2007/0067725 A1 | 3/2007 | Cahill et al. | |
| 2007/0186010 A1 | 8/2007 | Hall et al. | |
| 2007/0199556 A1 | 8/2007 | Murai et al. | |
| 2007/0209420 A1 | 9/2007 | Campian | |
| 2007/0228018 A1 | 10/2007 | Murai et al. | |
| 2008/0009969 A1 | 1/2008 | Bruemmer et al. | |
| 2008/0147089 A1 | 6/2008 | Loh et al. | |
| 2008/0223170 A1 | 9/2008 | Tealdi et al. | |
| 2008/0234861 A1 | 9/2008 | Fortell et al. | |
| 2008/0236324 A1 | 10/2008 | Inoue et al. | |
| 2008/0269949 A1 | 10/2008 | Norman et al. | |
| 2008/0302159 A1 | 12/2008 | Toeniskoetter et al. | |
| 2009/0038361 A1 | 2/2009 | Toeniskoetter | |
| 2009/0043424 A1 | 2/2009 | Khoshnevis | |
| 2009/0091149 A1 | 4/2009 | Chevassu et al. | |
| 2009/0235712 A1 | 9/2009 | Padmanabhan et al. | |
| 2009/0235713 A1 | 9/2009 | Toeniskoetter | |
| 2009/0314120 A1 | 12/2009 | Larsson | |
| 2010/0241260 A1 | 9/2010 | Kilibarda et al. | |
| 2010/0242561 A1 | 9/2010 | Reith et al. | |
| 2011/0107807 A1 | 5/2011 | Sato et al. | |
| 2011/0153034 A1 | 6/2011 | Philliben et al. | |
| 2011/0172788 A1 | 7/2011 | Kilibarda et al. | |
| 2012/0000891 A1 | 1/2012 | Nakanishi et al. | |
| 2012/0067851 A1* | 3/2012 | Lee ........................ | B23K 11/11 219/86.9 |
| 2012/0111135 A1 | 5/2012 | Ichibangase et al. | |
| 2012/0180559 A1 | 7/2012 | Koumoto et al. | |
| 2012/0181256 A1* | 7/2012 | Rotheut .................. | B23K 11/11 219/117.1 |
| 2012/0197573 A1 | 8/2012 | Pecher | |
| 2012/0210802 A1 | 8/2012 | Sarh et al. | |
| 2012/0247208 A1 | 10/2012 | Takahashi | |
| 2012/0297854 A1 | 11/2012 | Cyrek et al. | |
| 2013/0056451 A1* | 3/2013 | Hasegawa ............... | B23K 11/11 219/127 |
| 2013/0075378 A1* | 3/2013 | Sakai .................. | B23K 11/0033 219/127 |
| 2013/0211418 A1 | 8/2013 | Lim et al. | |
| 2014/0048523 A1* | 2/2014 | Moision ................. | B23K 11/115 219/136 |
| 2015/0108099 A1* | 4/2015 | Ferrero ................ | B23K 11/314 219/86.33 |
| 2018/0236594 A1* | 8/2018 | Gattabria ............... | B23K 11/311 |

FOREIGN PATENT DOCUMENTS

| | | |
|---|---|---|
| DE | 102008047800 A1 | 11/2009 |
| DE | 202011000315 U1 | 5/2012 |
| EP | 0924034 A2 | 6/1999 |
| EP | 2160258 A1 | 3/2010 |
| FR | 2895690 A1 | 7/2007 |
| GB | 2143800 A | 2/1985 |
| JP | 11-077575 | 3/1999 |
| JP | 2000334689 A | 12/2000 |
| JP | 2002315963 A | 10/2002 |
| JP | 2003127085 A | 5/2003 |
| JP | 2004017260 A | 1/2004 |
| KR | 20140117141 A | 10/2014 |
| WO | 2008145396 A1 | 12/2008 |
| WO | 2012160512 A1 | 11/2012 |

OTHER PUBLICATIONS

Extended European Search Report dated Jan. 29, 2014 in 7 pages for EP Application No. 11737447.0.

Notification of Transmittal of the International Search Report and the Written Opinion dated Oct. 19, 2010 from the corresponding International Application No. PCT/US2010/02756 filed on Mar. 10, 2010.

(56) References Cited

OTHER PUBLICATIONS

Extended European Search Report dated Nov. 16, 2012 in 10 pages for European Application No. 10754033.8.
Notification of Transmittal of the International Search Report and the Written Opinion dated Sep. 20, 2011 from the corresponding International Application No. PCT/US2011/021557 filed Jan. 18, 2011.

* cited by examiner

ELECTRIC RESISTANCE WELDING HEAD WITH ELECTRODES LOCATED ON THE SAME SIDE

CROSS-REFERENCE TO RELATED APPLICATIONS

This application claims priority benefit to European Patent Application No. 17157541.8, filed Feb. 23, 2017, the entire contents of which is incorporated by reference.

TECHNICAL FIELD

The present invention generally relates to the field of electric resistance welding.

BACKGROUND

Electric resistance welding heads with electrodes located on the same side are known, in particular of the type comprising:
- a support structure, provided with a connecting flange for connection to a wrist of an articulated robot,
- an electric transformer, carried by the support structure, having two input poles for connection to electric supply cables of said head and having two output poles,
- a ground electrode and a welding electrode carried by the support structure and electrically connected to the two output poles of the electric transformer,
- wherein said ground electrode and said welding electrode have respective main axes parallel to and spaced from each other and said electrodes are movably mounted with respect to said support structure along the respective main axes,
- an electrically operated actuator for driving a movement of said welding electrode with respect to said support structure along the respective main axis.

A welding head having these characteristics is described for example in United States Patent Application Publication No. US2012/0067851 A1.

Welding heads of the type indicated above are for example used for welding motor-vehicle bodies, whereas conventional welding guns are not usable because one of the two electrodes of the welding gun is not adapted to reach an area to be welded and/or whereas it is preferred to avoid pushing of a welding electrode on a surface of the motor-vehicle body which then results evident in the final motor-vehicle.

SUMMARY

The object of the present invention is to provide a welding head of the type indicated above which ensures a good quality of welding, with reliable and simple control of the pressure wherewith the welding electrodes are applied on the components to be welded.

A further object of the invention is to provide a welding head of the type indicated above which has compact dimensions, in order to be particularly effective for performing welding on components with different shape and dimension, being adapted to easily reach also areas with low access.

A further object of the invention is to realize a welding head of the type indicated above that can be easily and quickly adaptable to different applications.

Yet a further object of the invention is to ensure a sufficient and correct electric contact between the ground electrode and the respective component to be welded in any operative condition.

A further object of the invention is to guarantee that cables and/or tubes associated to the head are without risk of interference with unrelated bodies during the use of the robot to which the head is associated.

In view to achieve the aforementioned objects, the invention has a welding head of the type indicated at the beginning of the present description and further characterized in that the head comprises also:
- an elastic device which is operatively interposed between said ground electrode and said support structure,
- a detecting device for detection of a load of the elastic device,
- one or more electronic units for controlling the robot carrying said head and for controlling said welding head, wherein said one or more electronic control units are configured for:
- controlling movement of the robot in order to move an end portion of said ground electrode in contact with a component to be welded, while maintaining said welding electrode in a retracted position with respect to said ground electrode,
- continuing to control the robot movement in order to push said end portion of the ground electrode in contact with said component to be welded, causing an increase of the load of said elastic device until stopping the movement of the robot when the load of the elastic device reaches a predetermined threshold value,
- after said stop of the movement of the robot, actuating said actuator to advance said welding electrode through a predetermined length, until reaching a predetermined position with respect to said support structure,
- after reaching said predetermined position of said welding electrode, continuing to actuate said actuator for pushing an end portion of said welding electrode in contact with the component to be welded, so as to increase the force with which said actuator pushes said welding electrode in contact with the component until reaching a predetermined value of said force,
- after reaching said predetermined value of said force, supplying electrical current to said electrodes by means of said electric transformer for executing a resistance electric welding on said component.

Thanks to these characteristics, the welding head according to the invention is adapted to ensure a good quality of the welding, with a reliable and simple control of the pressure whereby the welding electrodes are applied on the components to be welded, in each phase of the welding procedure.

According to a further characteristic of the invention, the distance between the main axes of the ground electrode and of the welding electrode is adjustable. This characteristic enables the welding head to be easily adaptable to different applications which require a different distance between the electrodes.

In one exemplary embodiment, said adjustment is obtained because the ground electrode is slidably mounted within a support auxiliary body which is mounted on the support structure of the head in an adjustable position along a direction which is perpendicular to the main axis of the ground electrode, for example by means of blocking screws within respective slots.

According to a further relevant characteristic of the invention, the ground electrode comprises a load-bearing element of electrically conductive material having a front nose with a rounded end surface to which above a contact element is retained and sited, which defines a rounded front surface of contact with a component to be welded, said contact element being relatively deformable so as to recline itself on the component, increasing the contact surface, when said ground electrode is pushed in contact with the component to be welded.

In a preferred embodiment of the invention, the load-bearing element is a carry-plait element and said contact element is a plait with one or more layers of electrically-conductive wires which are twisted one to each other.

Thanks to this characteristic, a further improvement in the welding quality is obtained, in any operative condition and for any application, because the ground electrode is able to be adaptable to different surface configurations of components to be welded.

The carry-plait element has a rear face which carries, with the interposition of an electrically-insulating element, a column for driving sliding movement of the ground electrode, said column being slidably mounted in a cavity of the support auxiliary body.

The rear face of the carry-plait element supports, with the interposition of one or more electrically-insulating elements, an auxiliary anti-rotation pin for driving sliding movement of the ground electrode, which is slidably mounted in a cavity of the support auxiliary body which is parallel to and spaced from the cavity wherein the aforementioned driving column is slidable.

According to a further preferred characteristic of the invention, the output poles of the transformer are provided on different walls of the transformer body and said output poles are electrically connected to respective electrodes by means of a set of strips which are elastically deformable and which conduct electric current. In the configuration illustrated in the drawings, the welding electrode is connected to one of the two output poles by means of a first strip having a U-shape general configuration. Otherwise, the ground electrode is connected to one of the output poles of the transformer by means of:
  a second strip having a S-shape general configuration connected at a first end to the output pole and at a second end to the support structure of the head;
  a third strip having a S-shape general configuration connected at a first end of the support structure of the head and at a second end to a peripheral portion of the carry-plait element of the ground electrode. In this way, the electric current generated by the transformer is transmitted from the output pole to the ground electrode through the second strip, the support structure and the third strip.

Thanks to this structure and disposition, it is possible to obtain a configuration of head which is very compact and substantially flattened along the perpendicular direction to a plane containing the electrode axes.

In order to further increase this advantage, in the preferred embodiment, the support structure of the head comprises two steel plates, which are parallel to, spaced from, and rigidly-connected to each other and which are also parallel to the general plane defined by the two electrodes. The transformer is mounted between said plates. The connecting flange for connection to the robot has a U-shape general configuration, with an end plate having a passage for tubes and cables for connection between the robot and the head, and two parallel wings which are respectively screwed to said plates of the load-bearing structure, in such a way as said tubes and cables for connection between the robot and the head are not exposed to the external environment and are protected from the risk of interference with other bodies. For this purpose, the head according to the present invention is preferably associated to a robot of the type comprising a base structure, an articulated wrist of robot and a chain of robot elements which are mutually articulated and which connect the base structure to the wrist of the robot, wherein through this chain of mutually articulated robot elements and through the robot wrist is defined a continuous internal passage wherein are formed one or more cables and/or tubes for the electric supply and/or for the fluid supply to the welding head. A robot of this type is for example described and illustrated in the document U.S. Pat. No. 8,006,586 B2 which is assigned to the present Applicant.

Naturally, the welding head according to the invention can be used in any case with a robot of a traditional type or with a robot of any different type from what is here aforementioned.

Furthermore, the present invention is also directed to a method for executing a resistance electric welding on a component to be welded as described further below.

BRIEF DESCRIPTION OF THE DRAWINGS

Further characteristics and advantages of the invention will emerge from the ensuing description with reference to the annexed drawings, which are provided purely by way of non-limiting example, wherein.

Figure 1:
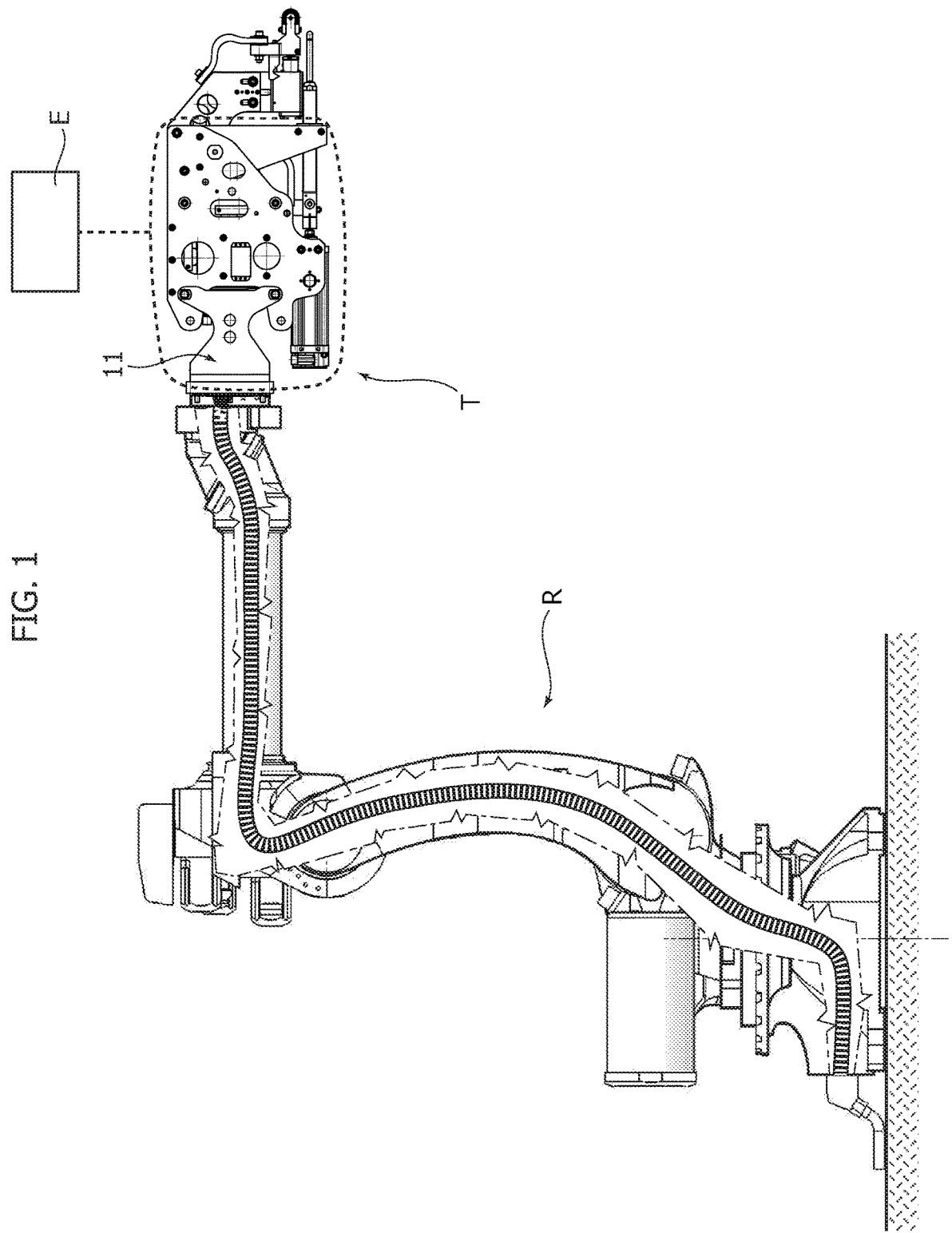
FIG. 1 shows a diagrammatic lateral partially cross-sectioned view of a robot on which the welding head of the invention is mounted.

In the following description many specific details are illustrated for an in-depth understanding of the embodiments. The embodiments can be provided without one or more specific details, or with others methods, components or materials etc. In other cases, known structures, materials or operations are not illustrated or described in detail in order to avoid unclarity of many aspects of the embodiments. Furthermore, the references herein used are only for convenience and they don't define the scope of protection of the embodiments.

DETAILED DESCRIPTION

In the annexed drawings, reference T generally designates a preferred embodiment of a welding head with electrodes located on the same side, according to the present invention. In particular, with reference to the perspective view of FIG. 2, the head T has a support structure 1 of metallic material, to which upper end is connected a connecting flange 11 serving for connecting the flange of a wrist of a robot R (FIG. 1) to the welding head T. The flange 11 comprises an end wall 111 intended to be connected to the flange of the robot R and two wings 110 arranged parallel to and spaced from each other and which are perpendicularly protruding from the end wall 111. The welding head T according to the invention is adapted to be used with a robot of any known and conventional type, wherein the head is adapted to be quickly connected to the robot wrist and is provided with its supply cables and tubes which are connected to the cables and tubes of the robot. Moreover, it is also possible to provide tubes and cables of the robot which protrude from the robot wrist and which continue without interruption up to connecting fittings provided on the transformer of the welding head.

At the opposite end of the head T with respect to the aforementioned flange 11, a ground electrode 3 and a welding electrode 4 are connected to the structure 1 and are located on the same side of the structure 1. The details relative to the two electrodes are described in the following of the present description.

Figure 3:
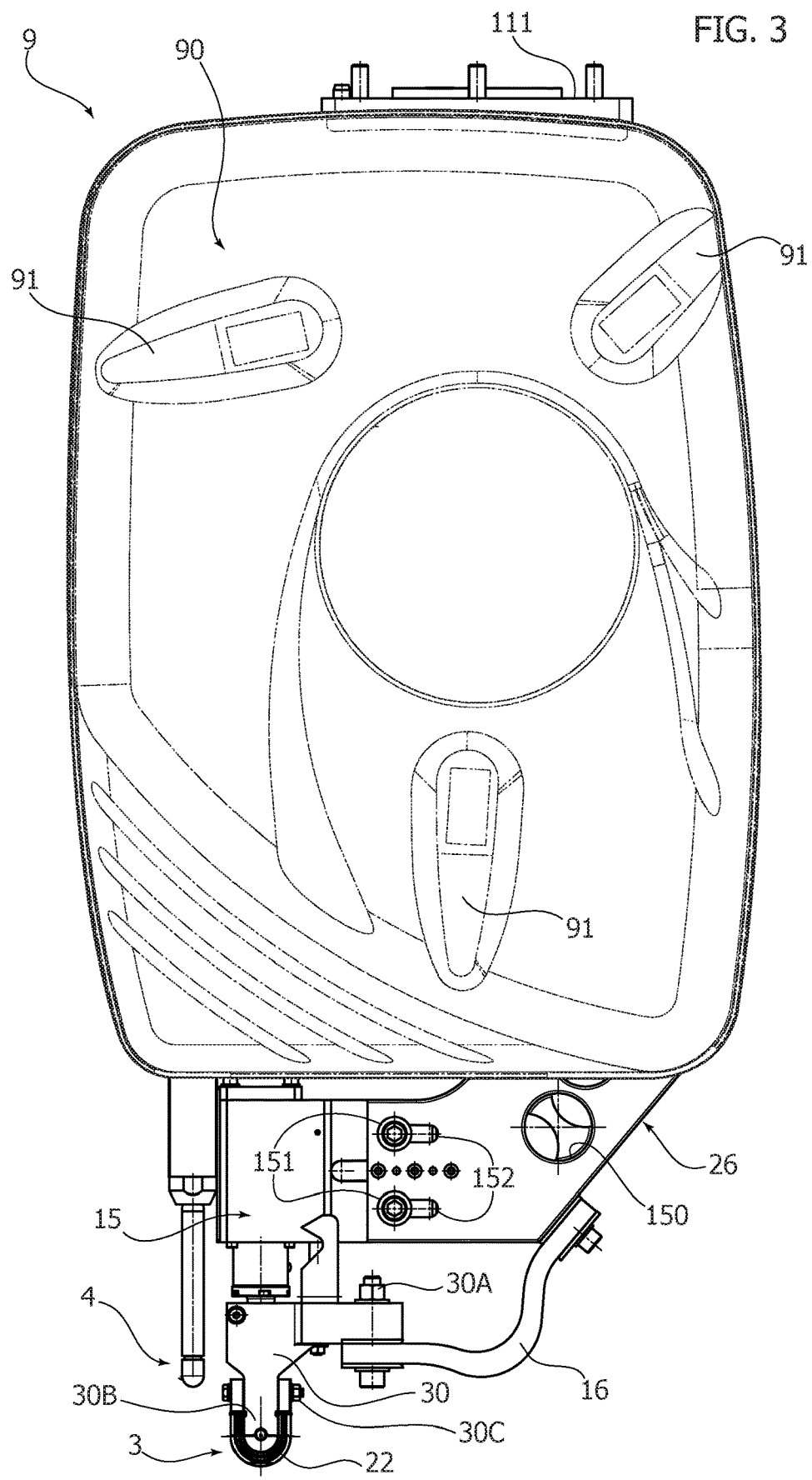
FIG. 3 shows a front view of the welding head of the FIG. 1 including the outer case.

As illustrated in the front view of FIG. 3, the support structure 1 of the head T is enclosed inside an outer case 9 constituted by two lateral half-shells 90 coupled one to each other, having main walls parallel to the general plane defined by the support structure of the head T. Each main wall of the two half-shells 90 has a plurality of tie rod blocking members 91 which are adapted in order to easily remove the two half-shells 90 in case maintenance operations on the head T need to be done.

Figure 2:
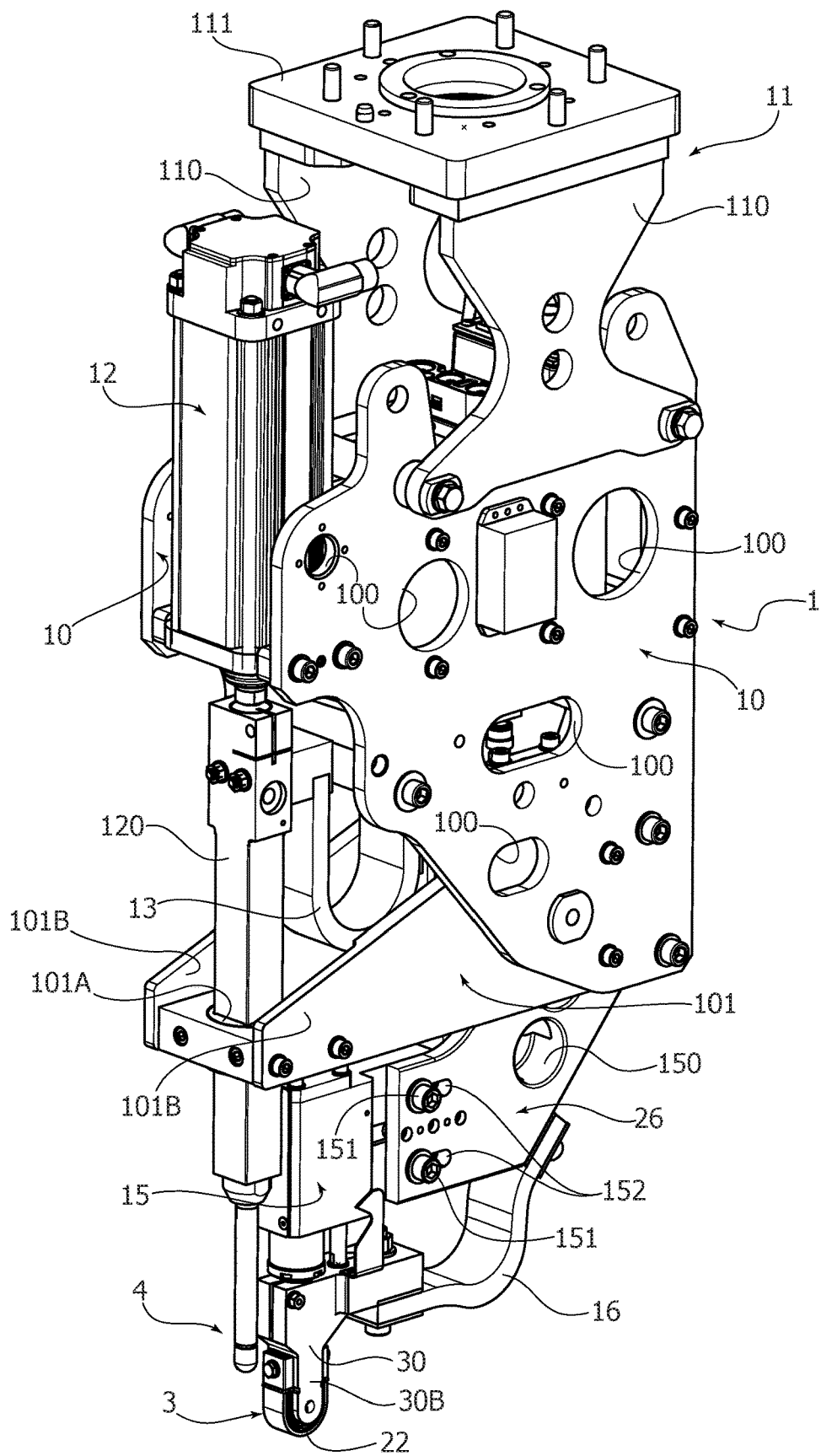
FIG. 2 is a perspective view of a preferred embodiment of the welding head according to the present invention wherein its outer case has been removed.

In particular with reference to the perspective view of FIG. 2 which shows the head T without the outer case 9, the support structure 1 of the head T comprises two steel plates 10 parallel to and spaced from one to each other, which are rigidly-connected one to the other and which are also parallel to the general plane defined by the two electrodes 3,4. The two steel plates 10 are provided with a plurality of lightening holes 100. In proximity of the lower portions of the plates 10 which are opposite to the flange 11, a bracket 101 is mounted, defining a passage 101A wherein a stem 120 of an actuator 12 is driven, said actuator 12 controls the position of the welding electrode 4 along its main axis. The actuator 12 can be for example an electrically operated actuator with the stem 120 axially driven by an electric motor, by means of a screw-and-nut system, as better described in the following. The body of the actuator is mounted between the two plates 10 of the support structure 1 of the head T.

With reference to FIG. 2, between the two steel plates 10, at their opposite ends with respect to the flange 11, a second metallic body 26 is also mounted, having a L shape general configuration and having a plurality of holes 150 for enabling passage of cables and tubes needed for functioning of the head T. An upper portion of the second metallic body 26 is interposed between two opposite walls 101B of the bracket 101, while a lower portion protrudes below the bracket 101. In particular with reference to FIG. 2 and the cross-sectioned view of FIG. 4, a support auxiliary body 15 is mounted on the second metallic body 26 at an end of its portion which protrudes from the bracket 101. The support auxiliary body 15 is slidably mounted relative to the second metallic body 26 and also relative to the support structure 1, along a direction which is perpendicular to the main axis of the welding electrode 4. The operative modes of displacement along such a direction are further indicated in the following of the present description.

Figure 4:
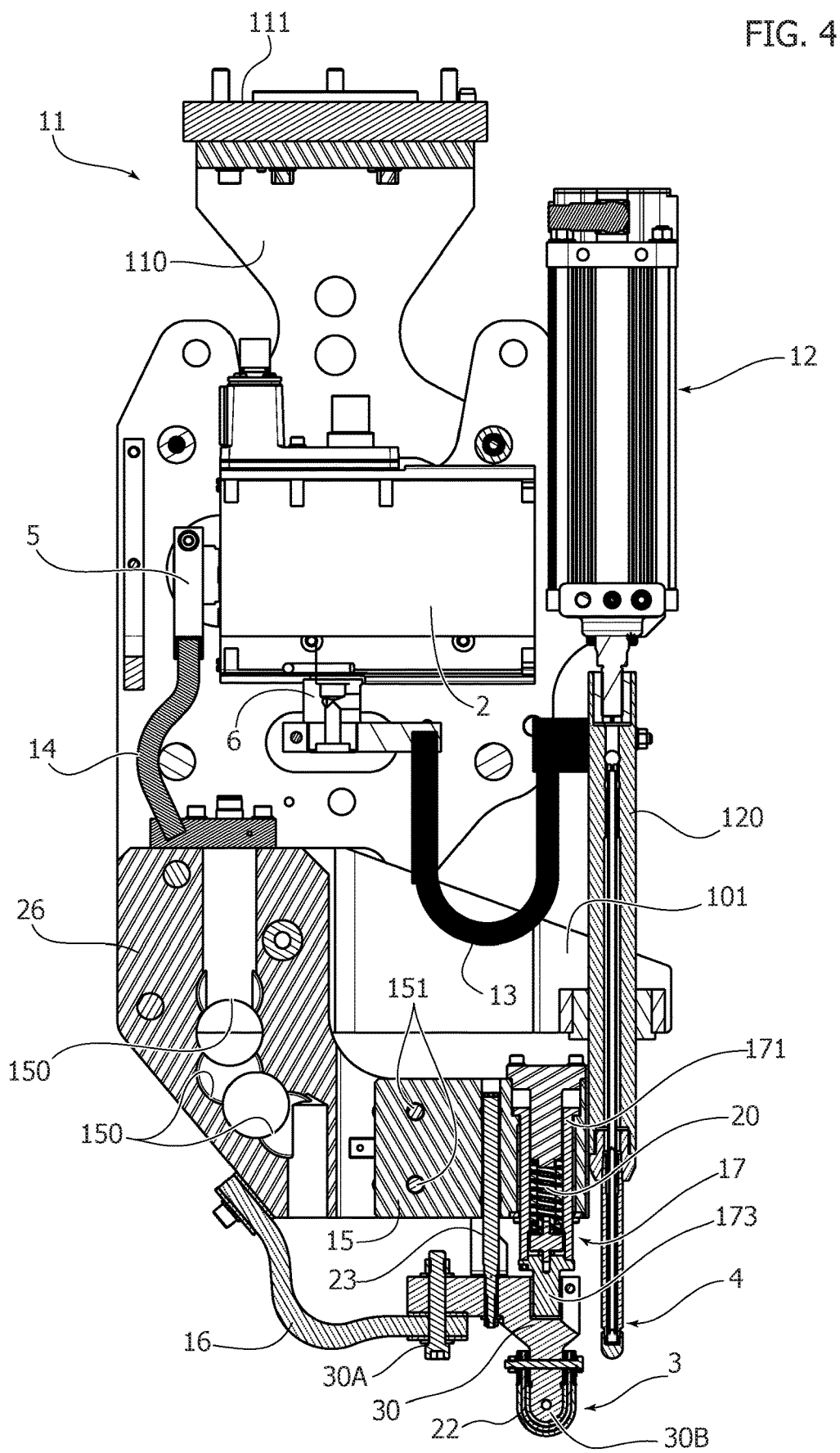
FIG. 4 is a partially cross-sectioned view of the head of FIG. 1 according to a plane which is parallel to the longitudinal axis of the head.
Figure 5:
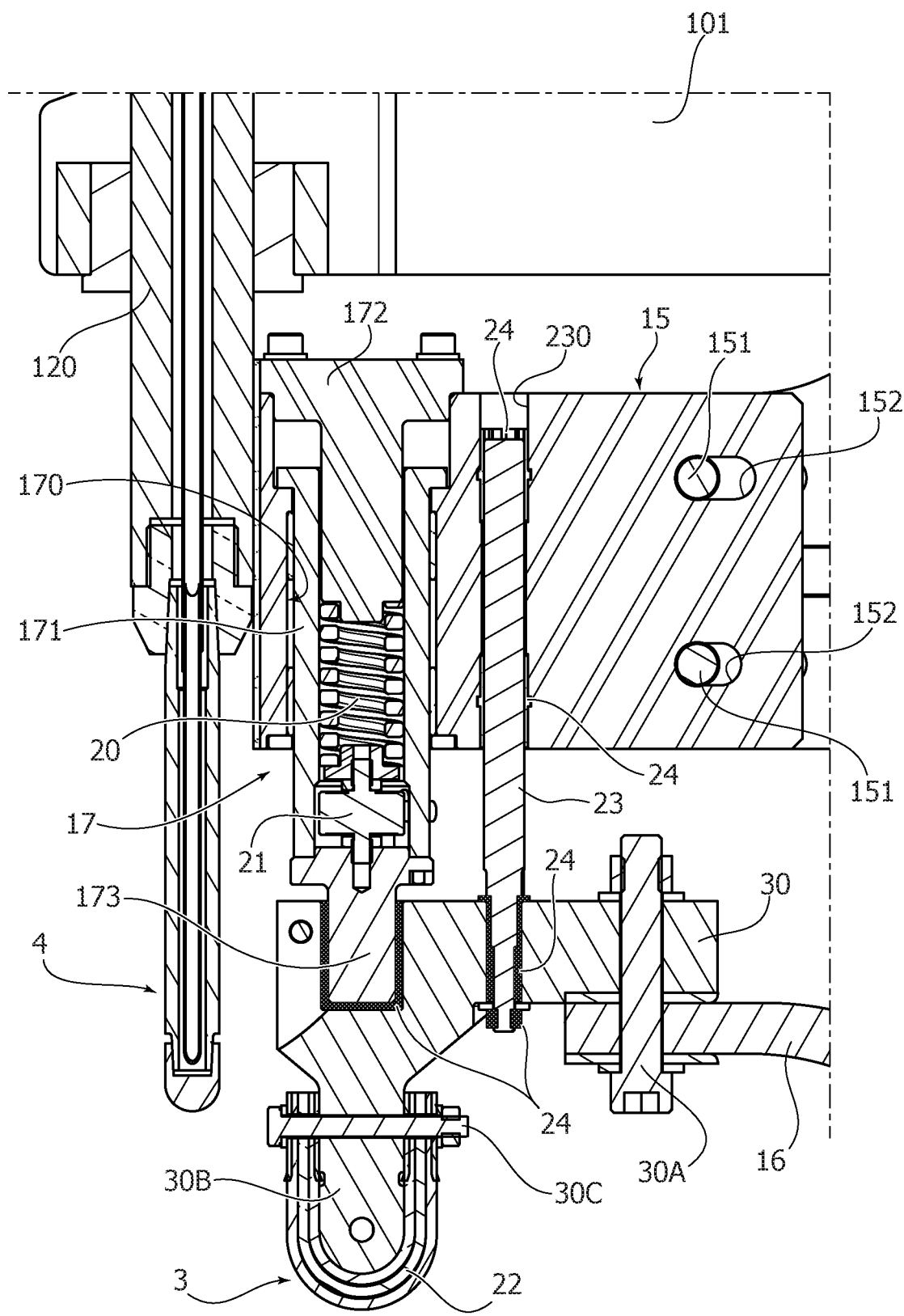
FIG. 5 is an enlarged scale view of a portion of FIG. 3.

As previously described, at an end of the head T there are the welding electrode 4 and the ground electrode 3, which are located on the same side of the head T. As best seen in FIGS. 4 and 5, according to an essential characteristic of the invention, the head T comprises an elastic device 20 operatively interposed between the ground electrode 3 and the support structure 1. In the embodiment illustrated in the drawings, the elastic device 20 is a spring, but it can be provided also in any other known mode such as in the embodiment of an electric or pneumatic actuator or with other types of spring means. In the following of the present description the elastic device it will be referred in the embodiment of a spring.

Figure 6:
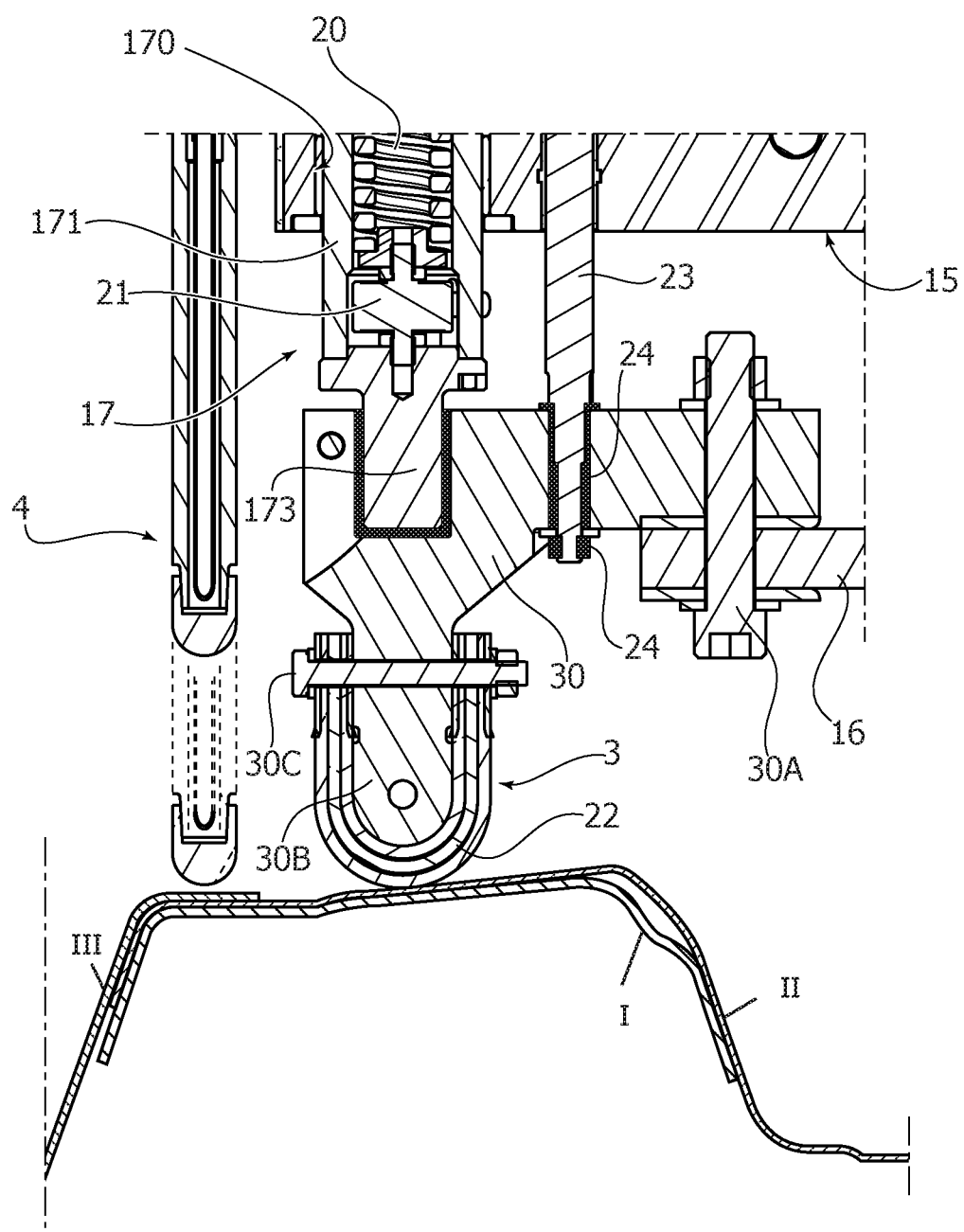
FIG. 6 is an enlarged partial front cross-sectional view detailed view of the head of FIG. 3 showing the welding head in a welding operative phase of a component.
Figure 7:
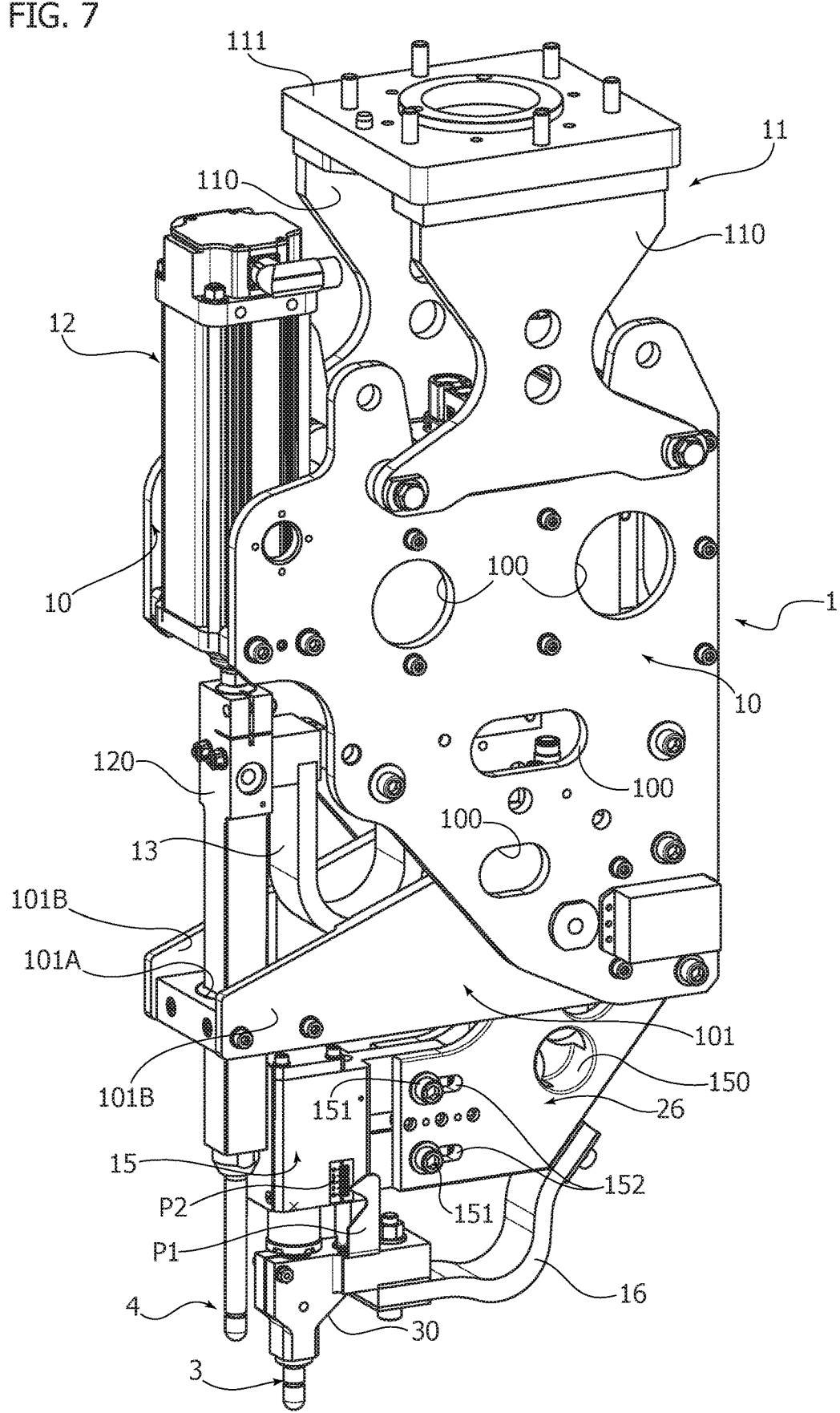
FIG. 7 is a perspective view of a second embodiment of the welding head according to the present invention in which its outer case has been removed.

Referring to FIGS. 1, 5, 6 and 7, the head T comprises also a detection device 21 of the load of the spring 20. In the embodiment of the invention illustrated in the drawings 1-6, the detecting device 21, for detection of a load of the spring 20, is a sensor adapted to send an electric signal to one or more electronic units E which is indicative of the load of the spring 20. In any case, the detecting device 21 of the load of the spring 20 can be realized in other known modes, for example it can be a device with visual control of an operator by means of an indicator P1 associated to a graduated scale P2 (FIG. 7). In particular with reference to the enlarged scale view of FIG. 5, the ground electrode 3 comprises a load-bearing element 30 of electrically-conductive material, having a front nose 30B with a rounded end surface above to which a contact element 22 is sited and retained, said contact element 22 defines a rounded front surface in contact with the component to be welded. The contact element 22 is relatively deformable, so as to recline itself on the component, so increasing the contact surface when the ground electrode 3 is pushed in contact with the component to be welded. In the embodiment of the invention shown in the drawings, the load-bearing element 30 is a carry-plait element and the contact element is a plait 22. The plait 22 in the embodiment herein illustrated has more layers of electrically-conductive wires twisted one to each other, so defining a rounded front surface for contact with the component to be welded. The plait 22 is relatively deformable in the direction of its thickness, so as to be reclined on the component, increasing the contact surface, when the ground electrode 3 is in contact with the component. In the embodiment herein illustrated, the plait 22 is retained on the front nose 30B of the carry-plait element 30 by means of a bolt 30C which passes through a hole formed on the front nose 30B (FIG. 5). The carry-plait element 30 has a rear face located on the opposite part with respect to the front nose 30B which carries, with the interposition of an electrically-insulating element 24, a column 17 for driving sliding movement of the ground electrode 3, said column being slidably mounted in a cavity 170 of the support auxiliary body 15. The driving column 17 comprises a bushing like body 171 which has an outer surface slidably mounted within the cavity 170 and an inner surface slidably mounted on a driving pin 172 which is rigidly-connected to the support auxiliary body 15.

In the embodiment herein illustrated, the spring 20 is in the form of a unique helical spring located within the bushing like body 171 between an end of the driving pin 172 and a bottom element 173 which is rigidly-connected to the carry-plait element 30 with the interposition of the electrically-insulating element 24. With reference to FIG. 5, the detecting device force sensor 21 is interposed between the spring 20 and the bottom element 173.

With reference to the enlarged scale view of FIG. 5, the rear face of the carry-plait element 30 carries, with the interposition of one or more electrically-insulating elements 24, an auxiliary anti-rotation pin 23 for driving sliding movement of the ground electrode 3. The anti-rotation pin 23 is slidably mounted in a cavity 230 of the support auxiliary body 15, in which the cavity 230 is parallel to and spaced from the cavity 170 wherein the driving column 17 is slidably mounted. Thanks to the auxiliary pin 23, the head T is provided without unintended oscillations of the ground electrode 3 around to the axis of the cavity 170, which could cause not well-executed welding.

According to an essential characteristic of the welding head T, an electric transformer 2 is carried by the support structure 1, (cross-section view of FIG. 4), said transformer having two input poles for connection of electric supply cables of the head T (not illustrated in the drawings) and two output poles 5, 6. The two output poles 5, 6 of the transformer 2 are provided on different walls of the transformer body 2 and are electrically connected to respective electrodes 3, 4 by means of a set of strips 13, 14, 16 which are elastically deformable.

In the embodiment illustrated in the drawings, the output pole 5 is provided on a front wall of the transformer 2, while the output pole 6 is provided on a lower end wall of the transformer 2. The welding electrode 4 is connected to the output pole 6 by means of a first strip 13 having a U-shape general configuration. The ground electrode 3 is otherwise connected to the output pole 5 of the transformer 2 by means of:
- a second strip 14 having a S-shape general configuration connected at a first end to the output pole 5 and at a second end to the second metallic body 26 of the support structure 1, and
- a third strip 16 having a S-shape general configuration connected at a first end of the second metallic body 26 to the support structure 1 and connected at second end to a peripheral portion of the carry-plait element 30 by means of a bolt 30A.

As a consequence to the structure above described, the electric current generated from the transformer 2 is transmitted from the output pole 5 to the ground electrode 3 through the second strip 14, the metallic body 26 and the third strip 16, and similarly from the output pole 6 to the welding electrode 4 through the first strip 13.

In order to avoid that the electric current which is generated from the transformer 2 can be conducted through elements of the head T, or portion of such elements, which don't need passage of current, with reference 24 are indicated insulating elements (bushings) adapted to isolate components of the head T from passage of electric current (FIG. 5). In particular, insulating bushings 24 are interposed between the anti-rotation pin 23 and the support auxiliary body 15 in the support cavity 230, between the anti-rotation pin 23 and the carry-plait element 30 and as previously said between the carry-plait element 30 and the driving column 17.

In the following of the present description there will be described structural and functional details of the head T for providing movement of the two electrodes 3, 4.

As previously described, the ground electrode 3 and the welding electrode 4 have respective main axes which are parallel to and spaced from each other and which are movably-mounted relative to the support structure 1 along the respective main axes. The welding electrode 4 is moved by the electrically operated actuator 12 which is mounted between the two plates 10 of the support structure 1. In this regard, the electric motor of the actuator 12 actuates a movable arm 120 which causes movement of the welding electrode 4 relative to the support structure 1 along the respective main axis. In the embodiment illustrated in the drawings, the movable arm 120 passes in a passage or hole 101A formed in an end portion of the trapezoidal metallic bracket 101 mounted between the two plates 10 of the structure 1.

The actuator 12 is of a known type, comprising for example an electric motor, a reducer and a nut which is put in rotation by the electric motor by means of the reducer. The rotation of the nut causes a linear movement of a screw which is screwed inside the nut, this screw being connected to the stem of the actuator 12. The components of the actuator 12 are not illustrated in the annexed drawings because, as previously said, such actuator can be provided according to any known configuration and because the removal of such details from the drawings render the latter more understandable.

One or more electronic units E are provided for controlling the robot and the head (FIG. 1 shows the unit E for controlling the robot). The electronic control unit of the head can be an autonomous unit or can be integrated in the unit E for controlling the robot.

An example of application which shows the vertical movement of the welding electrode 4 is illustrated in the enlarged scale view of FIG. 6. In this Figure with reference I is indicated a support element which is located below a first sheet element II and below a second sheet element III which have to be welded one to each other.

The electric control unit of the robot E is configured for controlling movement of the robot R in order to move an end portion of the ground electrode 3 in contact with the first sheet element II at one portion which is adjacent to a portion of the second sheet element III, maintaining the welding electrode 4 in a retracted position relative to the ground electrode 3. The electronic unit E is also configured for continuing to control movement of the robot R so as to push the end portion of the ground electrode 3 which carries the contact element or plait 22 in contact with the second sheet element III at a portion thereof adjacent only to the support element I, thus causing an increase of the load of the spring 20 associated to the ground electrode 3, until stopping the movement of the robot R when the load of the spring 20 reaches a predetermined threshold value.

After said stop of the movement of the robot R, the electronic control unit of the head (which in the illustrated example is integrated in the unit E) is also configured for actuating the electric motor of the actuator 12 in order to advance the welding electrode 4 through a predetermined distance, until reaching a predetermined position relative to the support structure 1 (see position indicated with dotted line in FIG. 6). After reaching the predetermined position of the welding electrode 4, the electronic unit E is configured for continuing to actuate the actuator 12 for pushing an end portion of the welding electrode 4 in contact with the second sheet element III at the aforementioned portion which is adjacent to a portion of the first sheet element II, until reaching a predetermined value of said force which is then maintained substantially constant (by means of a control of the electric absorption of the electric motor of the actuator 12) or alternatively which is then modulated according to any desired criteria.

Finally, the electronic unit E is configured for supplying electric current to the welding electrode 4 by means of the electric transformer 2 in order to execute an electric resistance welding on the two sheet portions to be welded. So the electric current passes from one of the output poles of the transformer 2 to the welding electrode 4, from the welding electrode 4 to the sheet elements II, III and from these to the other output pole of the transformer 2, passing through the first sheet element II and the ground electrode 3 which is in contact therewith.

In the present description and in the following claims, the expression "ground electrode" is used referring to an electrode however it is shaped and formed, via which the electric circuit is closed, enabling returning of the current flow towards the transformer. In a particular embodiment of the head T illustrated in the perspective view of FIG. 7, the ground electrode 3 is an electrode similar to an electrode of a conventional welding gun.

However, it is not excluded the case in which, in a welding head configured as here indicated, functioning as herein described of the welding electrode and of the ground electrode are inverted, for example inverting their positions with respect to the sheets to be welded (actuating a rotation of 180° of the head T) and/or inverting their polarities.

Thanks to the configuration of the electronic unit E and to the structural characteristics of the head above described, the welding head T according to the present invention is adapted to execute in an effective way welding on components of different dimension and shape, being able also to easily reach areas which are difficult to access, thanks to the compact configuration, and also to ensure in the same time a simple and reliable control of the welding quality.

In order to further improve versatility of the head T according to the present invention, the distance between the main axes of the ground electrode 3 and the welding electrode 4 is adjustable. For this scope, the ground electrode 3 is slidably mounted within the support auxiliary body 15 which is mounted on the support structure 1 in an adjustable position along a direction which is perpendicular to the main axis of the ground electrode 3. In the embodiment illustrated in the drawings and in particular with reference to FIG. 5, the support auxiliary body 15 is slidably mounted relative to the support structure 1 along the aforementioned perpendicular direction by means of engagement of blocking screws 151 within respective slots 152. In the preferred embodiment, the support auxiliary body 15 is adjustable along said direction by means of a manual adjustment. However, another actuator (not illustrated) can be provided only for actuating this displacement of the support auxiliary body 15 relative to the second metallic body 26 which is part of the structure 1.

In the welding head of the type according to the present invention, both the transformer 2 and the electrodes 3, 4 have a refrigeration with a fluid. For this reason, in the bundle of cables and tubes which come from the robot (not illustrated in the drawings) are comprised at least an inlet conduit of coolant and at least an outlet conduit of coolant.

Figure 8:
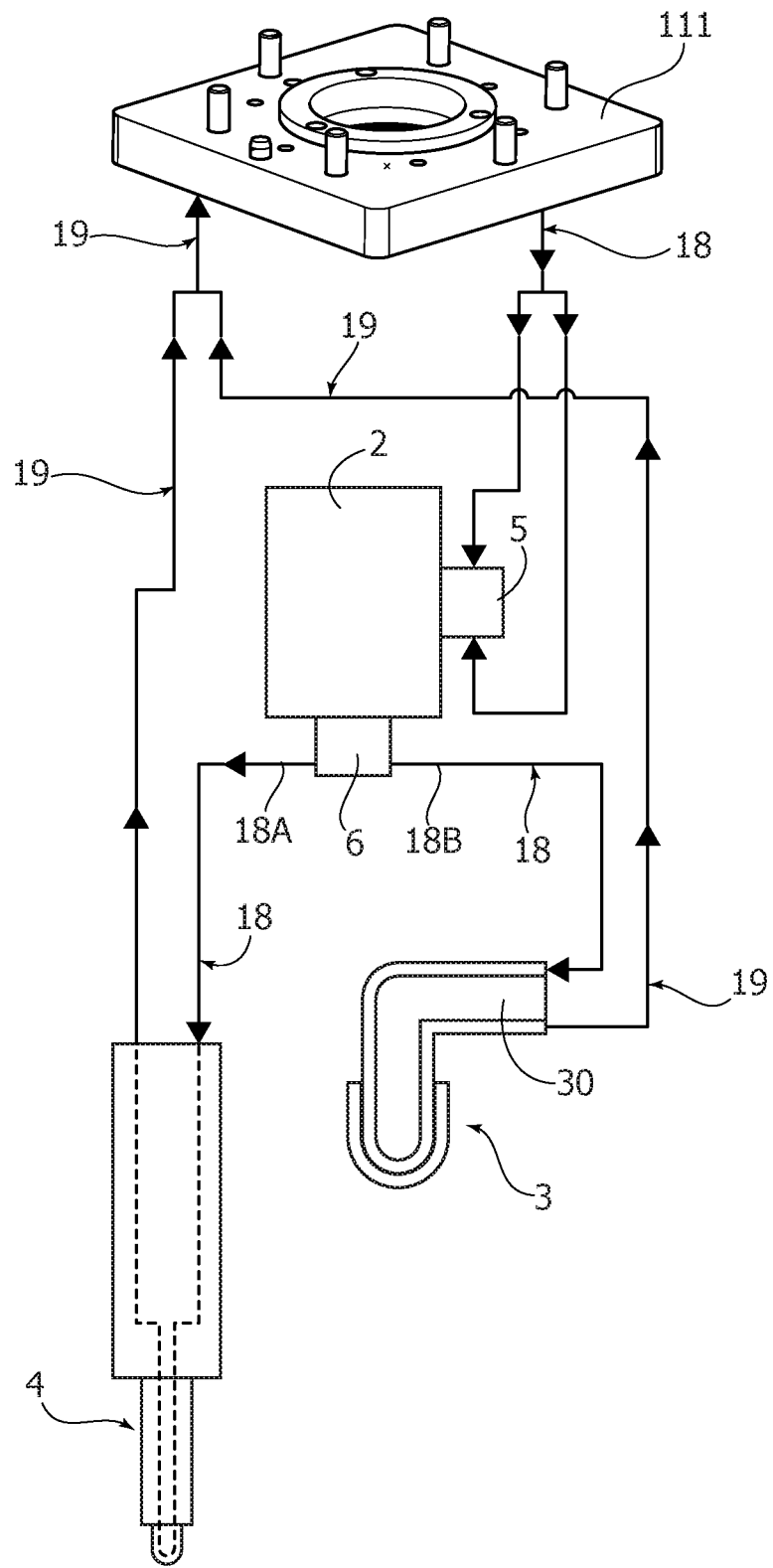
FIG. 8 shows a diagrammatic view of the cooling circuit of the head according to the present invention.

With reference to the diagrammatic view of FIG. 8, references 18, 19 respectively indicate an inlet conduit of coolant and an outlet conduit of coolant. In the embodiment illustrated in the diagrammatic view of FIG. 8, the inlet conduit directs coolant first of all to the cooling circuit (not illustrated) provided inside the transformer 2. From the cooling circuit which is inner to the transformer 2, the coolant goes out through two channels 18A, 18B which are formed in the body constituting the output pole 6 of the transformer 2. Then, the coolant is sent respectively to the carry-plait element 30, to the ground electrode 3 and to the welding electrode 4. The outlet conduits 19 pass through each electrode 3, 4 inside the robot, without passing through the transformer 2.

The coolant conduits 18, 19 are provided specifically for cooling by means of coolant both the welding electrode 4 and the ground electrode 3. This feature gives the advantage of providing a welding head adapted to execute multiple weldings on parts with high cycle-time of execution (typical for welding high quantities or volumes of parts of motor-vehicle bodies) avoiding over-heating issues that can affect electrodes wherein cooling is provided only by means of air (even if a plait is provided for a ground electrode.)

As previously said, the welding head according to the present invention is adapted to be used in a robot of any known and conventional type, in which the head is adapted to be connected in a quick way to the robot wrist and is provided with its supply cables and tubes which are connected to the cables and tubes of the robot.

Naturally, while the principle of the invention remains the same, the details of construction and the embodiments may widely vary with respect to what has been described and illustrated purely by way of example, without departing from the scope of the present invention. In particular, the welding head according to the invention is adapted to be used with association to any type of robot.

What is claimed is:

1. An electric resistance welding head with electrodes located on the same side, comprising:
    a support structure having a connecting flange operable to connect to a wrist of an articulated robot;
    an electric transformer connected to the support structure having two input poles operable to connect to electric supply cables and having two output poles;
    a ground electrode and a welding electrode connected to the support structure and electrically connected to the two output poles of the electric transformer, said ground electrode further comprises a load-bearing element of electrically-conductive material, said load-bearing element having a front nose with a rounded end surface above to which a contact element is sited and retained, said contact element defines a rounded front surface selectively in contact with a component to be welded;
    wherein said ground electrode and said welding electrode have respective main axes parallel to and spaced from each other, said ground and welding electrodes are movably mounted with respect to said support structure along the respective main axes;
    an electrically operated actuator connected to said welding electrode, the actuator operable to move said welding electrode with respect to said support structure along the respective main axis;
    said welding head further comprising:
    a spring positioned interposed between said ground electrode and said support structure;
    a detecting device operable to detect a load of the spring;
    one or more electronic units operable to control the robot carrying said head and to control said welding head;
    wherein said one or more electronic control units are further operable to:
    control movement of the robot in order to move an end portion of said ground electrode in contact with the component to be welded, while maintaining said welding electrode in a retracted position with respect to said ground electrode;
    continuing to control the robot movement in order to push said end portion of the ground electrode in contact with said component to be welded, causing an increase of the load of said spring until stopping the movement of the robot when the load of the spring reaches a predetermined threshold value, said contact element being relatively deformable, so as to recline itself on the component, increasing a contact surface defined by the rounded front surface, when said ground electrode is pushed in contact with the component to be welded;
    after said stop of the movement of the robot, actuating said actuator to advance said welding electrode through a predetermined length, until reaching a predetermined position with respect to said support structure;

after reaching said predetermined position of said welding electrode, continuing to actuate said actuator for pushing an end portion of said welding electrode in contact with the component to be welded, so as to increase a force with which said actuator pushes said welding electrode in contact with the component until reaching a predetermined value of said force; and after reaching said predetermined value of said force, supplying electrical current to said electrodes by means of said electric transformer for executing a resistance electric welding on said component.

2. The welding head according to claim 1, wherein said detecting device of the load comprises a sensor operable to transmit an electric signal which is indicative of the load to said one or more electronic units.

3. The welding head according to claim 1, wherein a distance between the main axes of said ground electrode and said welding electrode is adjustable.

4. The welding head according to claim 1, wherein said load-bearing element is a carry-plait element and said contact element is a plait with one or more layers of electrically-conductive wires which are twisted one to each other.

5. The welding head according to claim 1 further comprising a bolt operable to connect said contact element to said front nose of said load-bearing element, said bolt passing through a hole defined by said front nose.

6. The welding head according to claim 1 further comprising:

said load-bearing element has a rear face located on an opposite part to said front nose, said rear face carrying a driving column operable to drive sliding movement of the ground electrode; and an electrically-insulating element positioned between the rear face and the driving column, said driving column being slidably mounted in a cavity defined by said support auxiliary body.

7. The welding head according to claim 6, wherein said driving column comprises a bushing-like body having an outer surface slidably mounted within said cavity and an inner surface slidably mounted on a driving pin which is rigidly-connected to said auxiliary support body, said spring further comprising helical spring positioned within said bushing-like body between said driving pin and a bottom element rigidly-connected to the load-bearing element with the interposition of said electrically-insulating element, said detecting device of the spring load being interposed between said spring and said bottom element.

8. The welding head according to claim 6, wherein the rear face of said load-bearing element carries, with the interposition of one or more electrically-insulating elements, an auxiliary anti-rotation pin operable to drive sliding movement of said ground electrode, said auxiliary anti-rotation pin being slidably mounted in an anti-rotation pin cavity defined by said auxiliary support body, said anti-rotation pin cavity being parallel to and spaced from the cavity in which said driving column slides, in order to prevent oscillations of the ground electrode around to the axis of said cavity wherein said driving column slides.

9. The welding head according to claim 1 further comprising at least one inlet conduit of coolant and at least one outlet conduit of coolant positioned within said support structure, wherein said at least one inlet conduit passes through said transformer, said ground electrode and said welding electrode, so as to cool them with said coolant.

10. The welding head according to claim 9, wherein said at least one outlet conduit passes through said ground electrode and said welding electrode without passing through said transformer.

11. The welding head according to claim 1, wherein said support structure further comprises two steel plates parallel to and spaced from each other, said two steel plates are rigidly-connected one to the other and parallel to a general plane defined by the two electrodes;

said transformer is mounted between the two plates;

said connecting flange further comprising:
 a U-shape general configuration;
 an end plate operable to be connected to the robot wrist, the end plate having a passage for tubes and cables for connecting the robot and the head; and
 two parallel wings each respectively connected to one of said two steel plates of the support structure of the head, in such a way that said tubes and cables for connecting the robot and the head are not exposed to the external environment.

12. The welding head according to claim 11, wherein said actuator further comprises a body mounted between the two steel plates of the support structure of the head; and an actuator rod driven through a passage defined by a bracket rigidly-connected to lower portions of said two steel plates of the support structure of the head.

13. The welding head according to claim 1 further comprising an outer case further comprising two lateral half-shells coupled one to each other, each of said half-shells having main walls which are parallel to a general plane defined by said support structure, wherein each main wall of the two half-shells has a plurality of tie rod blocking members which are adapted for disassembling said two half-shells, the support structure of the head enclosed by the outer case.

14. An electric resistance welding head with electrodes located on the same side, comprising:

a support structure having a connecting flange operable to connect to a wrist of an articulated robot;

an electric transformer connected to the support structure having two input poles operable to connect to electric supply cables and having two output poles;

a ground electrode and a welding electrode connected to the support structure and electrically connected to the two output poles of the electric transformer;

wherein said ground electrode and said welding electrode have respective main axes parallel to and spaced from each other, said ground and welding electrodes are movably mounted with respect to said support structure along the respective main axes, said ground electrode is slidably mounted within a support auxiliary body which is mounted on said support structure in a position which is adjustable along a direction which is perpendicular to the main axis of the ground electrode;

an electrically operated actuator connected to said welding electrode, the actuator operable to move said welding electrode with respect to said support structure along the respective main axis;

said welding head further comprising:

an elastic device positioned interposed between said ground electrode and said support structure;

a detecting device operable to detect a load of the elastic device;

one or more electronic units operable to control the robot carrying said head and to control said welding head;

wherein said one or more electronic control units are further operable to:

control movement of the robot in order to move an end portion of said ground electrode in contact with a component to be welded, while maintaining said welding electrode in a retracted position with respect to said ground electrode;

continuing to control the robot movement in order to push said end portion of the ground electrode in contact with said component to be welded, causing an increase of the load of said elastic device until stopping the movement of the robot when the load of the elastic device reaches a predetermined threshold value;

after said stop of the movement of the robot, actuating said actuator to advance said welding electrode through a predetermined length, until reaching a predetermined position with respect to said support structure;

after reaching said predetermined position of said welding electrode, continuing to actuate said actuator for pushing an end portion of said welding electrode in contact with the component to be welded, so as to increase the force with which said actuator pushes said welding electrode in contact with the component until reaching a predetermined value of said force; and after reaching said predetermined value of said force, supplying electrical current to said electrodes by means of said electric transformer for executing a resistance electric welding on said component.

15. The welding head according to claim 14, wherein said support auxiliary body defines a slot and further comprises a blocking screw positioned in said slot, said support auxiliary body is slidably mounted with respect to said support structure along said perpendicular direction through movement of the blocking screw relative to the slot.

16. The welding head according to claim 15 further comprising a second actuator connected to the support auxiliary body operable to move the support auxiliary body relative to the support structure in said perpendicular direction.

17. The welding head according to claim 15 further comprising a manual adjustment device connected to the support auxiliary body operable to move the support auxiliary body relative to the support structure in said perpendicular direction.

18. The welding head according to claim 14, wherein said output poles of said transformer are provided on different walls of a transformer body, each of said output poles is electrically-connected to the respective electrode by a strip which is elastically-deformable and which conducts electric current.

19. The welding head according to claim 18, wherein said welding electrode is connected to the respective output pole by a first strip having a U-shape general configuration.

20. The welding head according to claim 18, wherein said ground electrode is connected to the respective output pole of the transformer by:

a second strip having a S-shape general configuration connected at a first end to the respective output pole and at a second end to said support structure; and a third strip having a S-shape general configuration connected at a first end to said support structure and at a second end to a peripheral portion of said carry-plait element of the ground electrode by a bolt, wherein electric current generated by said transformer is transmitted from said output pole to the ground electrode through said second strip, said support structure and said third strip.

* * * * *